US007891288B2

(12) United States Patent
Van Dalsem et al.

(10) Patent No.: US 7,891,288 B2
(45) Date of Patent: Feb. 22, 2011

(54) APPARATUS AND METHODS FOR PRODUCING FOOD PRODUCTS

(75) Inventors: Simon Van Dalsem, Alkmaar (NL); Thomas Black Short Gladstone, Berwick-Upon-Tweed (GB)

(73) Assignees: H. O. Short & Son Ltd., Berwick-Upon-Tweed (GB); Van Dalsem Design BV, Alkmaar (NL)

( * ) Notice: Subject to any disclaimer, the term of this patent is extended or adjusted under 35 U.S.C. 154(b) by 1567 days.

(21) Appl. No.: 11/184,199

(22) Filed: Jul. 19, 2005

(65) Prior Publication Data

US 2006/0207435 A1 Sep. 21, 2006

(30) Foreign Application Priority Data

Mar. 15, 2005 (GB) ................................ 0505307.9

(51) Int. Cl.
*A21B 7/00* (2006.01)

(52) U.S. Cl. ........................................................ 99/348

(58) Field of Classification Search ........... 99/485–489, 99/494, 516, 495, 345–347, 353–355, 450.1–450.8; 426/289–292, 520–523; 118/13–24
See application file for complete search history.

(56) References Cited

U.S. PATENT DOCUMENTS 3,045,280 A * 7/1962 Bonnafoux ................. 425/186
3,485,535 A * 12/1969 Fabre .......................... 406/61
3,919,969 A * 11/1975 Leverett ...................... 118/13
4,248,578 A * 2/1981 Worden ...................... 425/220
4,510,110 A * 4/1985 Mazzoni ................ 264/211.11
4,614,162 A 9/1986 Ryan et al.
5,090,593 A 2/1992 Ejike
5,386,939 A 2/1995 Ruegg
5,768,984 A * 6/1998 Gallego ....................... 99/494
5,855,165 A * 1/1999 Herrick, IV .................. 99/494
5,964,146 A * 10/1999 Kelly et al. ................... 99/467
6,732,454 B2 * 5/2004 Anderson et al. ............. 34/576
6,866,878 B1 * 3/2005 Battaglia .................... 426/516

FOREIGN PATENT DOCUMENTS

EP 0694261 A1 * 1/1996
GB 1081201 A * 8/1967
WO WO 00/15423 A1 9/1998

* cited by examiner

*Primary Examiner*—Tu B Hoang
*Assistant Examiner*—Thien Tran
(74) *Attorney, Agent, or Firm*—Senniger Powers LLP

(57) ABSTRACT

Apparatus 30 for production of food products, which apparatus 30 comprises a feed section 40 and a compression section 41, the feed section 40 comprising open channels 50 into which food for processing is introduced by a plurality of regulating helixes 70 and drive elements 51 in the channels 50 for moving the food along the channels 50, the compression section 41 lying adjacent the feed section 40 such that food is moved by the drive elements 51 from the channels 50 into the compression section 41, the compression section 41 comprising tubes 66 of desired cross-section and length, whereby in use food is moved along the channels 50 and into the compression section 41 by the drive elements 51, subjected to a desired compression in the compression section 41 and then leaves the compression section 41 at the end thereof remote from the feed section 40. Improved quality food products can thereby be provided.

31 Claims, 6 Drawing Sheets

APPARATUS AND METHODS FOR PRODUCING FOOD PRODUCTS

FIELD OF THE INVENTION

The invention relates to apparatus and methods for producing food products, and more particularly but not exclusively to the production of breakfast cereals and cereal based snacks.

BACKGROUND OF THE INVENTION

One particular sort of cereal or snack is an agglomerate of cereals, together with a binder such as syrup. The traditional way of making such a product consists of spreading a 'wet' blend of predominantly prefabricated cereals, some of which are puffed or crisped or flaked and hence very fragile, and a binding syrup, as a continuous layer onto a perforated continuous oven band, whereby during the baking/drying process a firm 'cake' is formed, which after sufficient cooling can be broken by means of mechanical breaking rolls or similar apparatus into the desired maximum size range for spoon-eaten breakfast cereals. As a consequence of this well established method, a significant amount of fines and unacceptably small pieces will result as a by-product, some of which can be recycled back into the wet blend, but with an upper limit of about 10% of that blend. The resulting agglomerate pieces of the preferred size range are usually called 'clusters'.

The fact that powerful breaking rolls were used is visible from the fracture zones of the finished clusters. These fracture zones can detract considerably from desired product appearance, and can reduce the crispness of those clusters in milk or yoghurt significantly, due to local absence of the desired continuous coating of binding sugars and non-sugar glazing ingredients.

An improved apparatus and method, which overcome problems associated with the prior art discussed above, have been disclosed and claimed in the present applicants' earlier patent EP-1113920. Following on from EP-1113920, the applicants have improved the apparatus and method further, resulting in the present invention.

SUMMARY OF THE INVENTION

According to the present invention, there is provided apparatus for production of food products, which apparatus comprises a feed section and a compression section, the feed section comprising a plurality of channels into which food for processing is introduced and corresponding drive elements in the channels for moving the food along the channels, the compression section lying adjacent the feed section such that food is moved by the drive elements from the channels into the compression section, the compression section comprising tubes of desired cross-section and length, whereby in use food is moved along the channels and into the compression section by the drive elements, subjected to a desired compression in the compression section and then leaves the compression section at the end thereof remote from the feed section, characterised in that the feed section further comprises a plurality of means situated over the drive elements for regulating the supply of food to the channels.

By including the plurality of means for regulating the supply of food to the channels, a much better flow of food is achieved with less compacting of the food at the junction between the feed section and the compression section of the apparatus.

The means for regulating preferably extend substantially parallel to the drive elements. However, in particular embodiments, the means for regulating could be inclined to the drive elements, in a plane parallel to the axes of the drive elements. In such an embodiment, the angle of inclination would preferably be small, with the lowest part of the means for regulating preferably being adjacent the junction between the feed section and the compression section of the apparatus.

Preferably the plurality of means for regulating extend across substantially all the width of the channels. In a particular embodiment, each means for regulating extends across about three channels.

In another arrangement, the means for regulating may extend substantially perpendicularly to the drive elements in a plane substantially parallel to the plane of the drive elements. An advantage of this arrangement is that there are even less locations in the feed section where food can remain undisturbed because the means for regulating extend in one direction whilst the drive elements extend perpendicularly thereto. If this arrangement is used, the plurality of means for regulating preferably have a combined width which extends substantially the length of the feed section. Typically, three means for regulating can be provided to achieve this result. This is likely to be less than the number required in an arrangement where the means for regulating lie substantially parallel with the drive means.

The means for regulating are preferably temperature controlled. For example, a shaft of each means for regulating can define a core for accommodating a circulating fluid. Thus, a circulating fluid, such as heated water, may be used to control the temperature of each means for regulating. Indeed, each means for regulating may be independently temperature controlled.

Each means for regulating may have a diameter in the range of 30 mm to 150 mm, more preferably 85 mm to 110 mm. Clearly, however, the diameter of each means for regulating will be at least partly dependent on the width of each channel and its associated drive element.

Preferably each means for regulating is an auger or an open helix screw element. More preferably, each helix screw element, if used, has a pitch between flights of between 20-130 mm, more preferably 50-80 mm.

In a specifically preferred embodiment, alternate means for regulating rotate in opposite directions. Thus, one helix, for example, will rotate in a forward direction, its immediate neighbours will rotate in rearward directions, and their immediate neighbours will rotate in the forward direction, etc. Improved distribution and dispersion of food is thereby achieved.

The means for regulating preferably rotate at between 10-60 rpm, which is relatively slow and assists in achieving good dispersion of the food and helps to reduce compaction of the food between the feed section and the compression section.

Preferably adjacent means for regulating substantially touch each other during use, so that tips of flights of adjacent helixes, for example, essentially scrape food from each other to assist in good dispersion of the food.

To avoid unwanted build up of food material on the means for regulating, the means for regulating are preferably manufactured from a non-stick material such as polytetrafluoroethylene (PTFE). With this in mind, the means for regulating may be manufactured from a solid bar of non-stick PTFE (such a teflon, delrin), or may simply be a helix coated with PTFE.

Each drive element is preferably an elongate screw threaded element, and may be either an auger or an open helix screw element.

Each drive element preferably extends at least partly along the length of the compression section.

The feed section includes a plurality, and more preferably a multiplicity of parallel channels, and the compression section preferably includes a corresponding number of tubes. The width of the compression section across the channels preferably matches the width of a conveyer onto which food leaving the compression section falls.

Each drive element is preferably removably mounted in the apparatus so that different drive elements can be used.

The diameter of the drive elements is preferably in the range 5 mm to 150 mm, for example 5 mm to 35 mm and preferably 10 mm to 25 mm for a range of breakfast cereal snacks, and from 10 mm to 150 mm (preferably 20 mm to 100 mm, and more preferably 25 mm to 75 mm) for snack food items or functional food items.

The diameter of the or each tube in the compression section is preferably between 0.1 mm and 10 mm larger than the drive element diameter, preferably 1 mm to 5 mm larger.

The compression section preferably has means to allow variation in the length of the or each tube. This is preferably achieved by interchangeability of compression section elements.

The apparatus may include a raking device for movement over the means for regulating to help spread food over all of the plurality channels.

The apparatus may include a cutter at the end of the compression section for cutting into sections food leaving the compression section.

The apparatus is particularly useful for manufacturing fragile food products, particularly fragile puffed, crisped or flaked cereal food products.

The invention further provides food manufacturing apparatus comprising ingredient silos, mixing apparatus, conveying means for transferring ingredients from the silos to the mixing apparatus, a binding material container, means for conveying binding material to the mixing apparatus, delivery apparatus for delivering mixed ingredients and binding material to apparatus according to the invention, an oven and a conveyer for conveying food from the compression section through the oven.

The invention further provides a method of producing a food product using apparatus according to the invention, comprising the steps of introducing a food mixture into a feed section of the apparatus, dispersing the food mixture across the channels using the regulator means, moving the food mixture along the channels of the feed section by operating the drive elements, compressing the food mixture in the compression section and removing for further processing food leaving the compression section of the apparatus.

The drive elements are preferably operated continuously during the method according to the invention.

The method may comprise a further step of selecting a desired length of the compression section to achieve a desired compression of the food mixture.

The method may comprise the step of cutting the food mixture as it leaves the compression section.

BRIEF DESCRIPTION OF THE DRAWINGS

By way of example, embodiments of apparatus and a method for producing food products will now be described with reference to the accompanying drawings, in which.

DETAILED DESCRIPTION OF THE DRAWINGS

Figure 1:
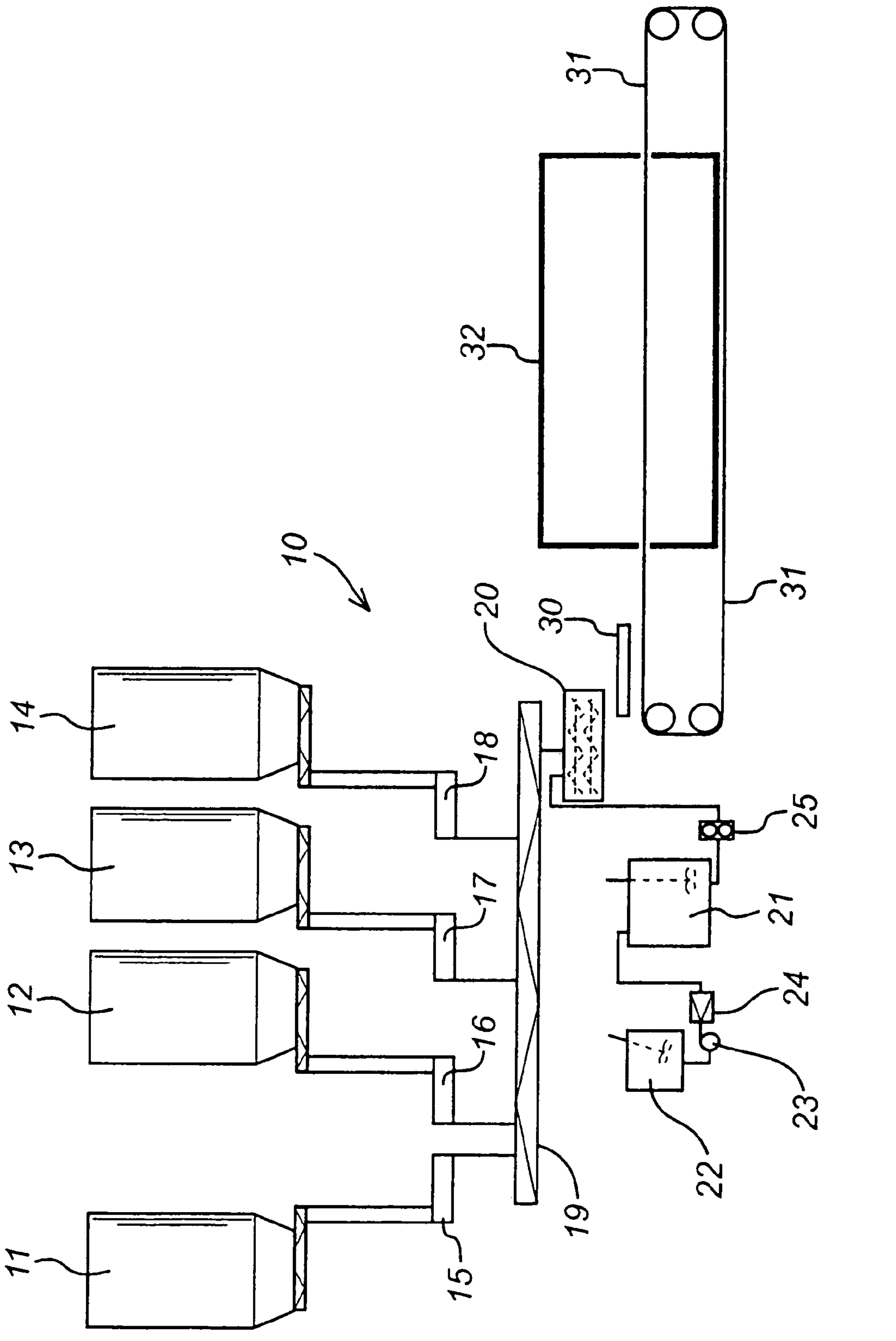
FIG. 1 is a schematic view of a complete installation for producing a food product.

With reference to FIG. 1, an installation 10 for producing a food product has four ingredient silos 11, 12, 13, 14 for containing dry ingredients such as cereal, rice, flour, grain, nuts, fibre-rich materials, herbs, spices, processed cereals (such as rolled, flaked, puffed, crisped and/or low density extruded cereals), fruit pieces or indeed any food or food component suitable for the intended use. The silos have metering equipment, such as weigh band feeders 15, 16, 17, 18 for metering the flow of ingredients from the silos 11, 12, 13, 14 onto a conveyor 19 which conveys the ingredients to a mixing station 20. Also fed into the mixing station 20 is an edible binding solution (for example, a solution/dispersion of sugars, starches, molasses, maltodextrins, glucose syrups, fats and oils, as well as flavourings) fed from a binder holding vessel 21 which is in turn fed from a binder preparation vessel 22. A standard sanitary pump 23 is used to transfer the binder solution from the preparation vessel 22 to the holding vessel 21, via an in-line filter element 24 (which is optional). A positive displacement pump 25 of sanitary design provides continuous metering of the desired flow of binder solution to the mixing station 20. The silos 11, 12, 13, 14, metering equipment 15, 16, 17, 18, conveyor 19, mixing station 20, binder holding vessel 21 and binder preparation vessel 22 are all standard and will be familiar to those skilled in the art. For this reason, a more detailed description is not supplied.

Material from the mixing station 20 is fed to apparatus 30 according to the invention for producing a food product and food product from the apparatus 30 falls onto a continuous conveyor 31 which moves the food product through an oven 32, which includes a cooling section, after which the final food product is taken away for packaging (not shown).

The mixing station 20 and the apparatus 30 will be described in more detail in relation to FIGS. 2 and 3 of the drawings.

Figure 2:
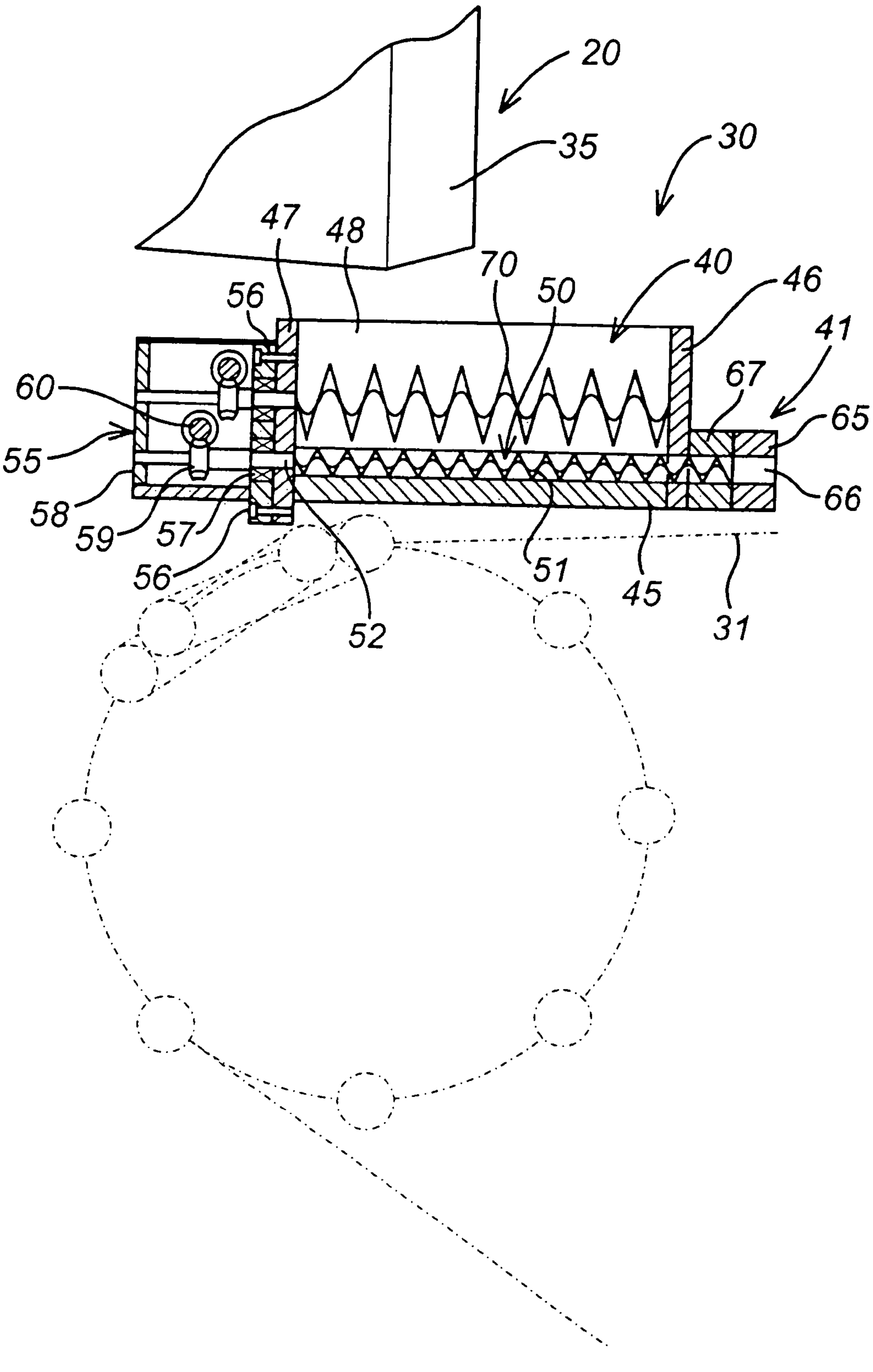
FIG. 2 is a side view, partly in section, of apparatus according to the invention.
Figure 3:
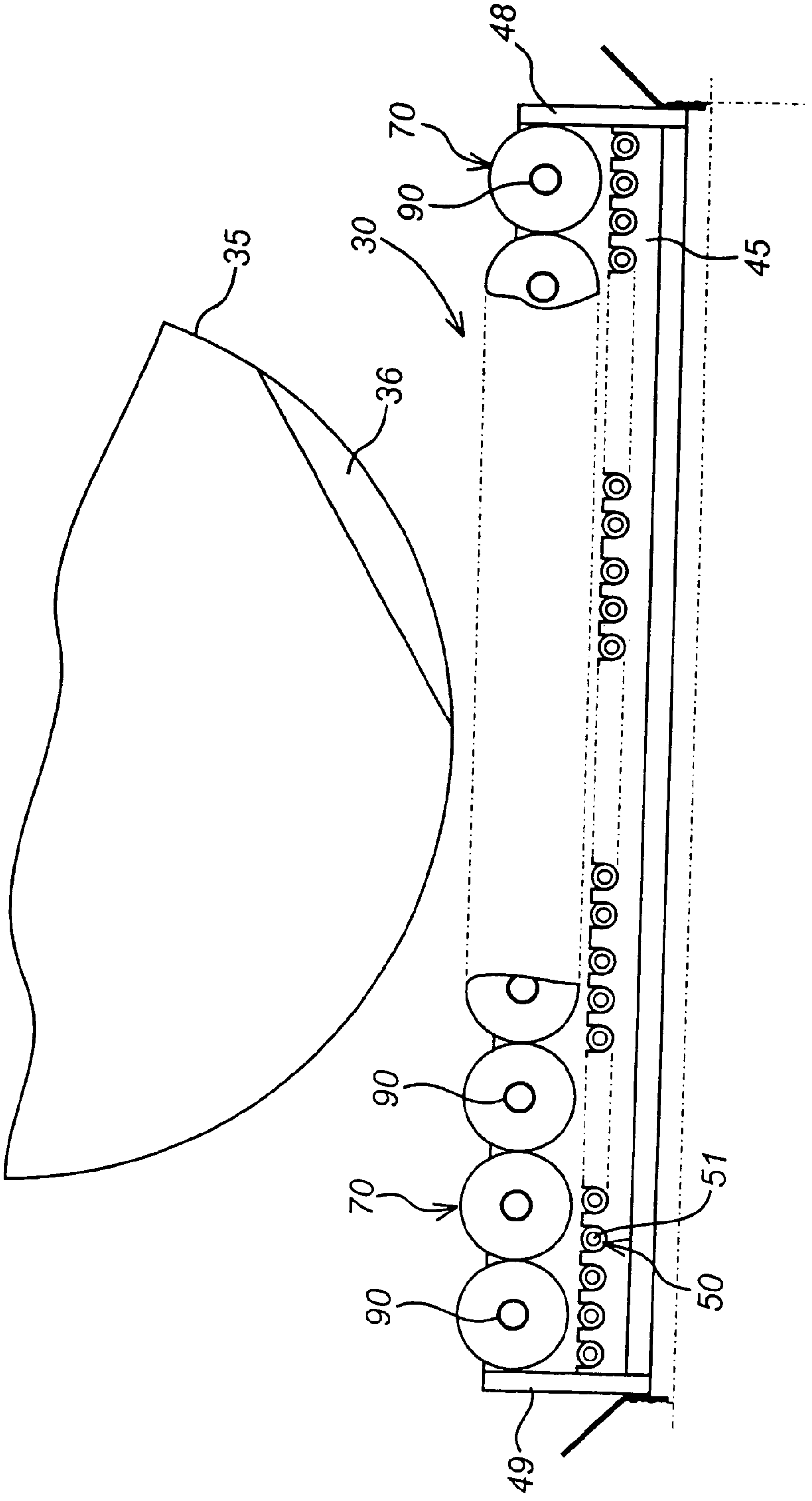
FIG. 3 is a front view of the apparatus of FIG. 2.

As shown in FIGS. 2 and 3, the mixing station 20 has a flow-through, rotating mixing drum 35 which rotates to mix ingredients supplied from the silos 11, 12, 13, 14 together with binder material to form an ingredient mixture 36. As can be seen in FIG. 2, the drum 35 has an axis of rotation inclined at a small angle to the horizontal so that the mix 36 will tend to flow along the drum 35 (from left to right in FIG. 2) until it leaves the drum 35. Alternatively, a continuous mixer with paddles and/or augers may be used. The mixing drum 35 (or, in the alternative, the continuous mixer) may be mounted on an axis via a subframe, allowing a pivoting movement to spread mixed material evenly into the apparatus 30 for processing the mixture.

The apparatus 30 for processing the mixture 36 has a feed section generally indicated at 40 and a compression section generally indicated at 41. The feed section 40 has a compartment open at the top defined by a base 45, a front wall 46, a back wall 47 and side walls 48, 49. The base 45 is formed with a series of parallel U-shaped channels 50 in each of which lies a drive element 51. Each drive element 51 is screw threaded and in the embodiment described is a conveying screw of an open helix design, although it will be appreciated that a conventional auger design may be used. Above the drive elements 51 is situated a layer of open helixes which act to evenly spread the food mixture as it falls into the feed section 40 of the apparatus. The drive elements 51 and helixes 70 can be manufactured from any food approved metal or plastics material which provides sufficient strength to withstand the relatively low pressures generated in the apparatus. The walls and base of the feed section are manufactured from food approved materials such as stainless steel and/or PTFE, and are of a smooth surface to minimise build up of residual material and also to ease cleaning.

The drive elements 51 each extend from a drive shaft 52 which passes through the rear wall 47 of the feed section and into a drive section 55 secured to the rear wall 47 of the feed section 40 by bolts 56. Each drive shaft 52 is journalled in a bearing 57 and is located also for rotation in a rear wall 58 of the drive section 55. Each drive shaft 52 carries a roller gear 59 and all the roller gears 59 are driven by an elongate worm gear 60 which extends across the width of the feed section and is driven by a motor or other drive means which is not shown. A similar drive arrangement applies to the layer of helixes 70, which are also located for rotation in the front wall 46 of the feed section 40.

The compression section 41 extends from the front wall 46 of the feed section, the front wall 46 having a series of holes in it, through which holes the drive elements 51 pass. The drive elements 51 extend some way into the compression section 41, as shown in FIG. 2, and the compression section 41 has at the free, front end thereof a compression member 65 which provides a series of tubes 66, one for each drive element 51 and channel 50, through each of which material is urged by the associated drive element 51. The compression member 65 is removably mounted on a base block 67 of the compression section 41, the base block also having a series of cylindrical holes formed therein, each engaged by an associated drive element 51 as shown in FIG. 2. The means of attachment of the compression member 65 are not shown in FIG. 2 but consist of bolts or other suitable means for removably holding the compression member 65 in place.

Interchangeability of the compression member 65 is important since it will be appreciated that the longer the compression member 65 extends away from the feed section, and therefore the longer the tubes 66 are, the more material will be compressed before it emerges from the compression section 41. The amount of compression exerted on the material being processed will effect the nature of the resulting food product. The compression section 41 is made from food approved materials, such as stainless steel and/or PTFE and has a smooth surface to minimise build up of material and to ease cleaning.

The diameter of each of the screw drive elements 51 can range from 5 mm to 150 mm and is preferably in the range 5 mm to 35 mm diameter for a range of breakfast cereal products, more typically in the range 10 mm to 25 mm, and for 15 mm to 150 mm diameter for snack food items or functional food items, the diameter range preferably being 20 mm to 100 mm or typically 25 mm to 75 mm. It will be appreciated that these sizes are all preferred rather then essential.

The diameter of tubes 66 in the compression section 41 is in the range 0.1 mm to 10 mm larger than the diameter of the screw drive elements 51 and preferably between 1 mm and 5 mm larger than the diameter of the screw drive elements 51.

As can be seen in FIG. 3, this embodiment or apparatus has thirty two drive elements 51 and associates channels 50 in the feed section and the compression section 41 also has thirty two tubes 66 arranged parallel to one another. Eleven regulating helixes 70 extend in a layer over the drive elements 51 substantially parallel thereto, with each helix essentially abutting its adjacent helixes. It will be appreciated that the apparatus could operate with more or less drive elements 51 and/or regulating helixes 70, and an ideal arrangement is where the width of the apparatus corresponds to the width of a conveyor onto which food from the apparatus is collected for subsequent cooking or other processing. The width of each regulating helix 70, however, extends ideally over above three adjacent channels 50, thereby resulting in good spreading of the food mixture.

Each regulating helix has very open flights, with a pitch of between 50-80 mm between flights. As a result, the food mixture does not get compacted between the flights, but is generally dispersed over the full width of the food section and falls through the regulating helixes 70 into the channels 50 below.

To assist in the dispersion and spreading of the food mixture across the channels 50 of the food section 40, alternate regulating helixes 70 rotate in opposite directions. The tips of the flights of each helix also scrape adjacent helixes, thereby helping to ensure that areas of compaction of the food mixture do not occur. This is particularly important around the junction between the food section 40 and the compression section 41, which in the past has been a problem.

As can be seen in FIG. 2, the distance between the outlet from the tubes 66 and the conveyor 31 is small, in order to minimise distortion of food product leaving the tubes 66. If a more irregular shape of food is desired, the fall height can be increased, thereby allowing a degree of distortion. It is anticipated that the free distance of the apparatus above the oven band can be varied from 2 mm to 100 mm.

As can also be seen in FIG. 2, the apparatus 30 is positioned at a small angle towards the conveyor 31. This arrangement facilitates wet cleaning and evacuation of cleaning liquids. It will be appreciated that the apparatus could be horizontal, or arranged at larger angles to the horizontal. The invention itself, as claimed, is not limited to arrangement of the apparatus at any particular angle to the horizontal.

In use, the mixture 36 from the drum 35 falls into the feed section 40 and is spread over the base area of the feed section 40 by the regulating helixes 70 shown in FIGS. 2 and 3.

As explained above, the length of the tubes 66 in the compression member 65 will determine the amount of compression of material being processed. It has been found that tubes 66 with a length of 20 mm to 60 mm, more typically 30 to 50 mm, provide shaped food pieces with a low level of compression, presenting a natural irregular appearance. A more extended compression section, with the tubes 66 having a length between 40 mm and 150 mm provides sufficient compression to allow a more defined shape to be formed, depending on the size and shape of the final part of the compression zone and the shape of the orifice. It will be appreciated that the shape of the orifice from which material leaves the compression member 65 could be varied, for example to provide an orifice which is square, triangular, trapezoidal or oval.

The apparatus 30 may be provided with a cut-off device but none is shown in the drawings. Cut-off devices could be of various types. A guillotine cut-off device, with a straight or angled blade is a preferred type, but rotary cutting knives or diaphragm operated cutters can be used successfully.

A device to close the extrusion orifice temporarily can be employed to obtain sufficient compression to allow defined food shapes to be created. The closing device could be combined with a cut-off device, if desired.

The agglomerated food products thus obtained can be packed directly after baking/drying upon sufficient cooling and there is no need for breaking up into smaller sizes, or size classification with a set of screens. All food components are well and evenly covered by a protective layer of glazing ingredients, providing optimum crispness and improved "bowl life" where a cereal product is immersed in milk or other liquid. The low compression applied to delicate materials, such as puffed cereals ensures that the delicate structures are not damaged. The apparatus allows use of soft materials such as soft fruit pieces, and the application of those fruit pieces formulated to withstand baking/drying are now a realistic option.

Figure 4:
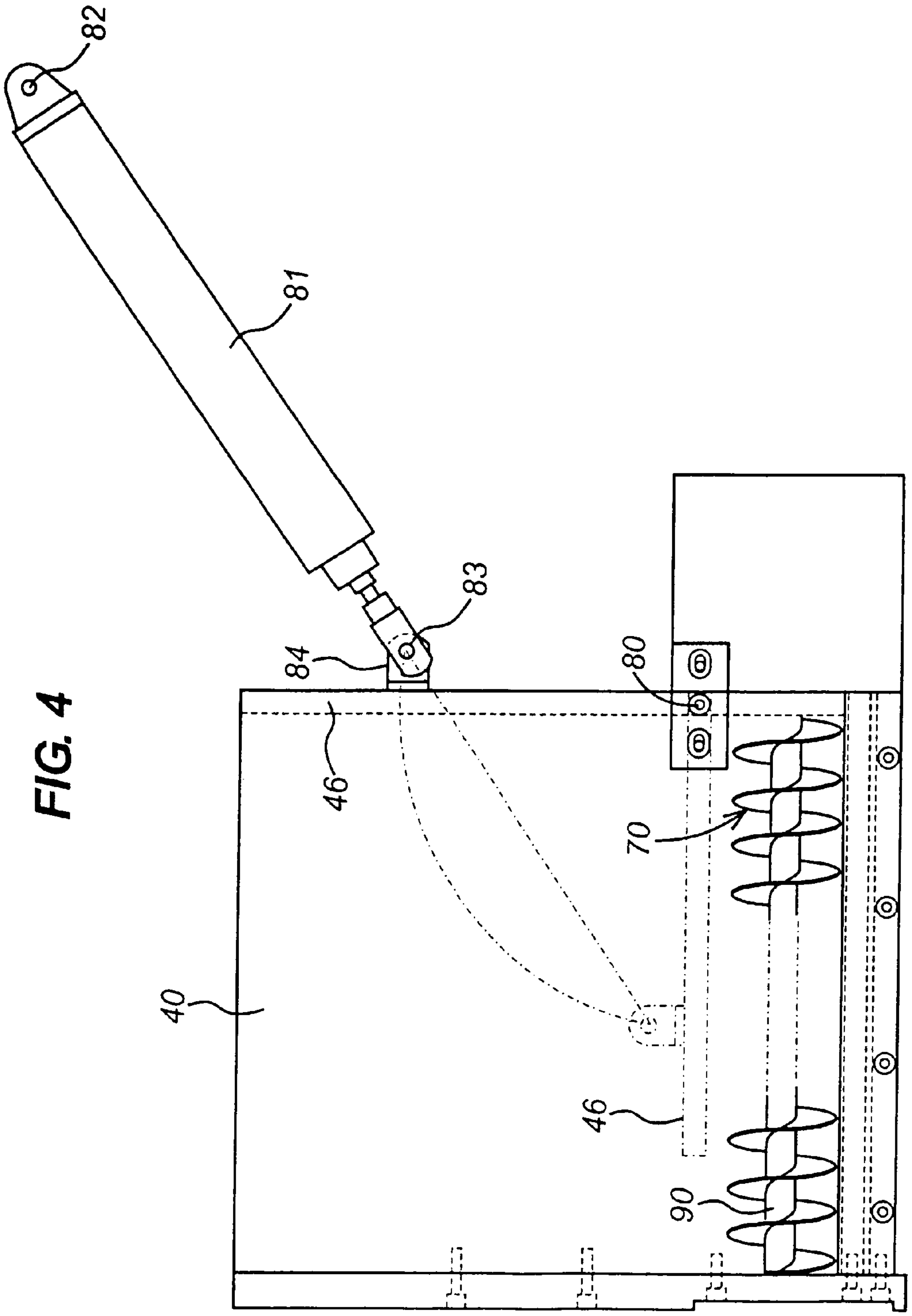
FIG. 4 is a side view similar to that of FIG. 2, but of an alternative embodiment of apparatus according to the invention.

Turning now to FIG. 4, an alternative embodiment of apparatus 30 is shown. In this embodiment, the front wall 46 has been enlarged and mounted about a hinge 80. The hinged front wall 46 has a width which is identical to the internal width of the feed section 40. A pneumatic drive cylinder 81 is mounted at one end 82 to a support structure (not shown) and at its other end 83 to a flange 84 extending from the hinged front wall 46. Upon activation of the drive cylinder 81, the front wall 46 pivots about hinge 80 to act as a compression plate to apply pressure to the mixture 36 such that the mixture 36 is continuously fed to the regulating helixes 70. The amount of pressure can be readily controlled by controlling the drive cylinder 81, which could be hydraulically driven rather than pneumatic, and the pressure can be released quickly when desired simply by swinging the front plate 46 about the hinge 80 into its vertical position.

As can be seen in FIG. 4, the hinged front plate 46 can move between a vertical position and a substantially horizontal position. When in its vertical position, any mixture 36 adhering to the wall 46 can be allowed to fall onto the regulating helixes 70 whilst fresh mixture 36 is introduced from the mixing drum 35. If necessary, material could be scraped from the front plate 46 to prevent unwanted build-up of mixture 36 on the front plate.

By using a hinged front plate 46 as shown in FIG. 4, a significantly increased product output can be obtained, and the range of materials that can be handled is increased. Further, materials with little or no lubrication or of poor flow characteristics can be used.

Figure 5:
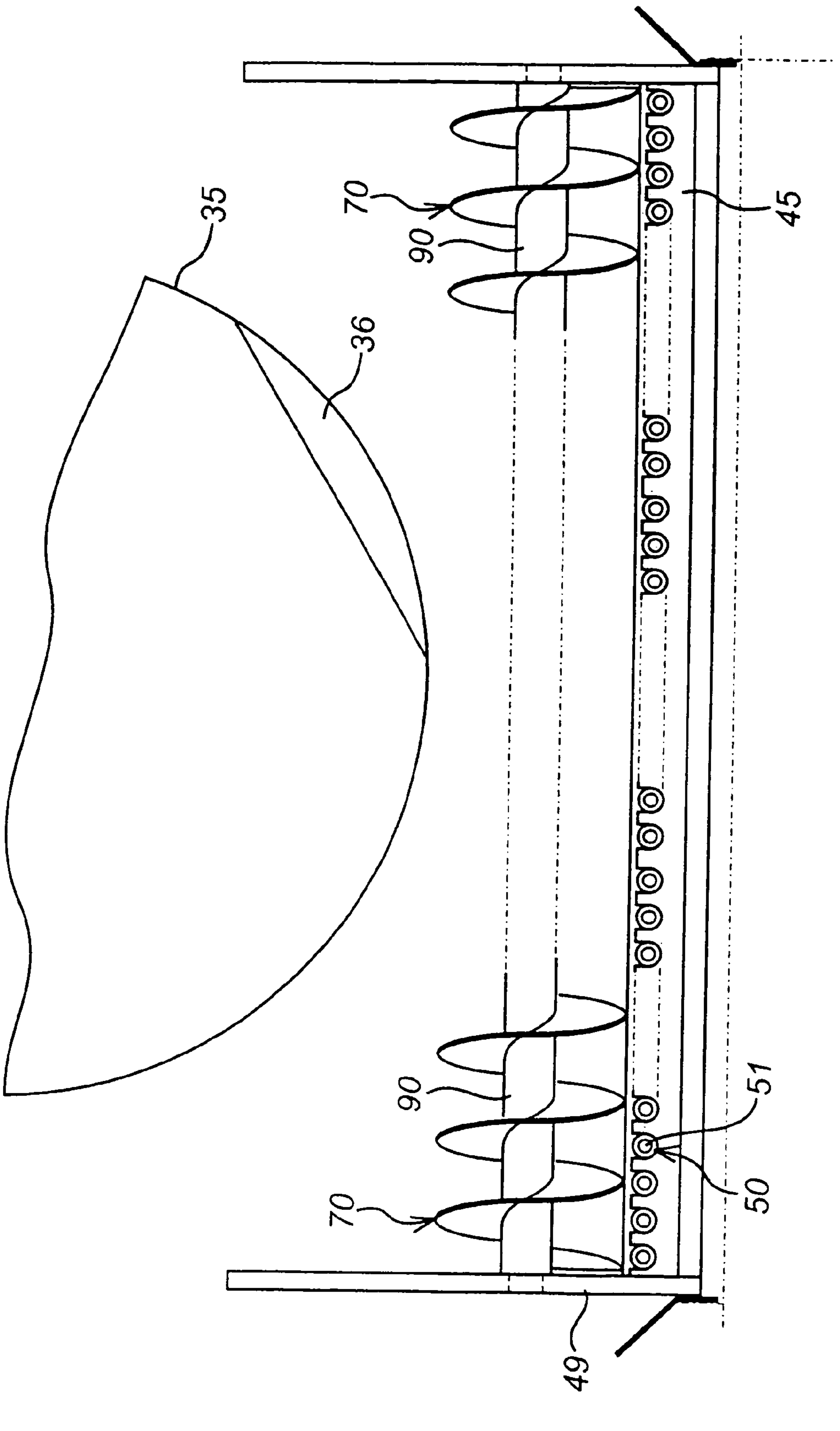
FIG. 5 is a front view similar to that of FIG. 3, but of an alternative embodiment according to the present invention.
Figure 6:
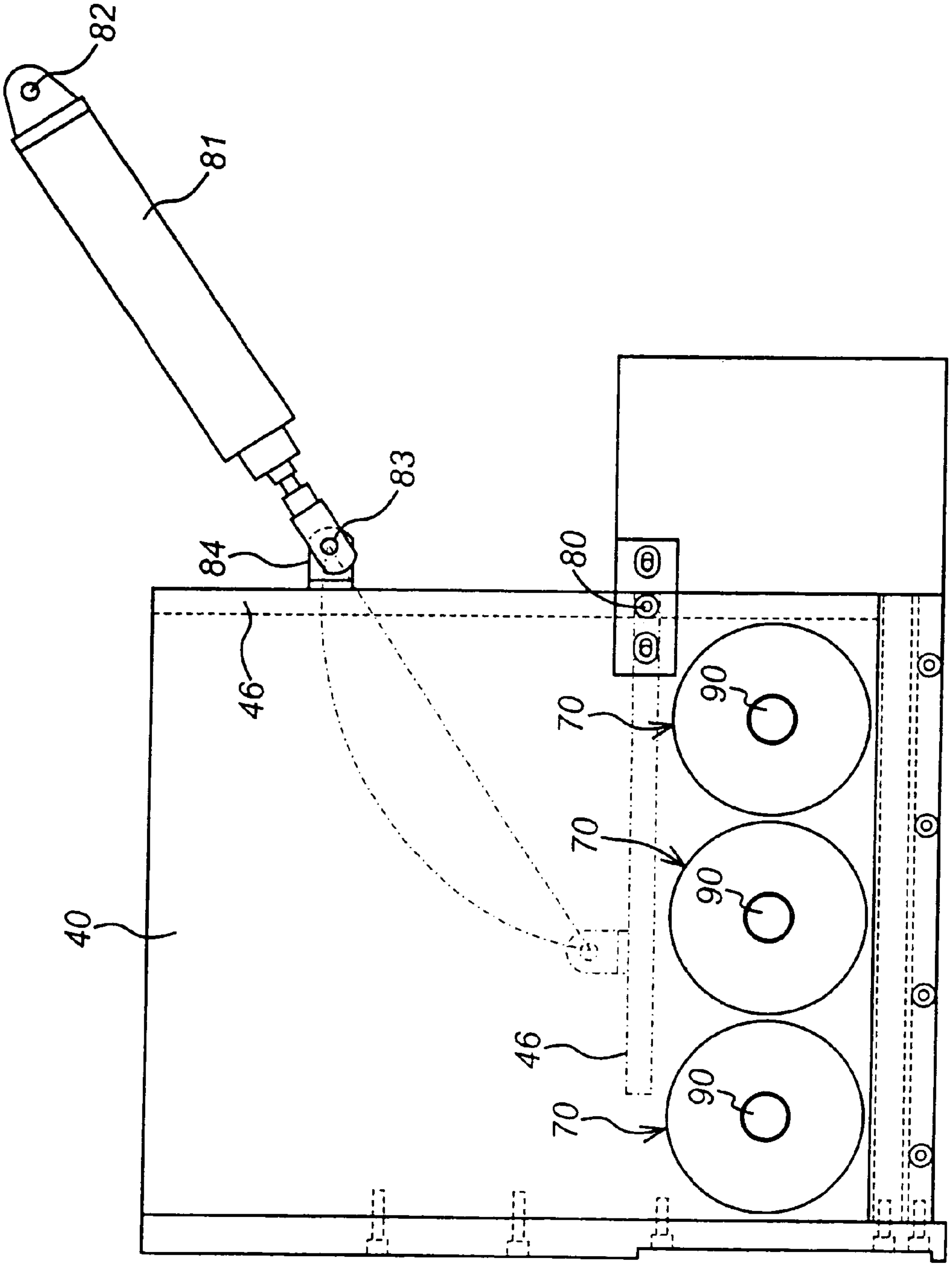
FIG. 6 is a side view similar to that of FIG. 4, but of the embodiment shown in FIG. 5.

Turning now to FIGS. 5 and 6, these are similar views to those shown in FIGS. 3 and 4, but wherein the regulating helixes 70 or augers extend substantially perpendicularly to the drive elements 51 in a plane substantially parallel to the plane of the drive elements. Hence, the means for regulating 70 shown in FIGS. 5 and 6 are essentially substantially perpendicular to the means for regulating shown in FIGS. 3 and 4. If these means for regulating 70 in FIGS. 5 and 6 have diameters of between 900 and 1200 mm, it is possible that only three regulating helixes 70 will be required to extend the full length of the feed section. Thus, less component parts will be required, which may be a distinct advantage.

Finally, as shown in the Figures, the regulating helixes have central shafts 90 which can be hollow and accommodate circulating fluid, such as heated water. In this way, the temperature of each regulating helix 70 can be controlled. By controlling the temperature of the regulating helixes 70, the temperature of the food supply passing through the feed section can be similarly controlled.

It will be appreciated that variations and modifications to the apparatus described may be made; the scope of the invention is defined in the appended claims.

The invention claimed is:

1. A fragile puffed, crisped or flaked cereal based food product producing apparatus, the apparatus comprising a feed section and a compression section, the feed section comprising a plurality of channels into which fragile puffed, crisped or flaked cereal is supplied and corresponding drive elements in the channels for moving the food along the channels, the compression section lying adjacent the feed section such that food is moved by the drive elements from the channels into the compression section, the compression section comprising tubes of selected cross-section and length, whereby in use food is moved along the channels and into the compression section by the drive elements, subjected to compression in the compression section and then leaves the compression section at the end thereof remote from the feed section; and the feed section further comprising a plurality of parallel rotating helixes located over the drive elements and at all times in operation spaced away from the drive elements for regulating the supply of food to the channels without compacting the food, wherein the plurality of parallel rotating helixes are adjacent and rotate in opposite directions with respect to each other.

2. Apparatus according to claim 1, wherein the parallel rotating helixes extend substantially parallel to the drive elements.

3. Apparatus as claimed in claim 1, wherein the parallel rotating helixes for regulating extend across substantially all the width of the channels.

4. Apparatus as claimed in claim 1, wherein each parallel rotating helix extends across about three channels.

5. Apparatus as claimed in claim 1, wherein the parallel rotating helixes extend substantially perpendicularly to the drive elements in a plane substantially parallel to the plane of the drive elements.

6. Apparatus as claimed in claim 5, wherein the parallel rotating helixes have a combined width which extends substantially the length of the feed section.

7. Apparatus as claimed in claim 5, wherein three parallel rotating helixes are provided.

8. Apparatus as claimed in claim 1, wherein each parallel rotating helixes can be temperature controlled.

9. Apparatus as claimed in claim 8, wherein a shaft of the parallel rotating helixes can accommodate a circulatory fluid.

10. Apparatus as claimed in claim 1, wherein each parallel rotating helix has a diameter in the range 30mm to 150mm.

11. Apparatus as claimed in claim 10, wherein each parallel rotating helix has a diameter in the range 85mm to 110mm.

12. Apparatus as claimed in claim 1, wherein each parallel rotating helix is an auger or an open helix screw element.

13. Apparatus as claimed in claim 12, wherein each helix screw element has a pitch between flights of between 20-130mm, or more preferably 50-80mm.

14. Apparatus as claimed in claim 1, wherein the parallel rotating helixes rotate at between 10-60 rpm.

15. Apparatus as claimed in claim 1, wherein adjacent parallel rotating helixes substantially touch each other during use.

16. Apparatus as claimed in claim 1, wherein the parallel rotating helixes are manufactured using non-stick material.

17. Apparatus as claimed in claim 16, wherein the non-stick material is polytetrafluoroethylene.

18. Apparatus as claimed in claim 1, wherein each drive element is an elongate screw threaded element.

19. Apparatus as claimed in claim 18, wherein each drive element is an open helix screw element.

20. Apparatus claimed in claim 18, wherein each drive element is an auger.

21. Apparatus as claimed in claim 1, wherein each drive element extends at least partly along the length of the compression section.

22. Apparatus as claimed in claim 1, wherein the feed section includes a plurality of parallel channels and a compression section having a corresponding number of tubes.

23. Apparatus as claimed in claim 1, wherein each drive element is removably mounted in the apparatus to allow interchangeability of drive elements.

24. Apparatus as claimed in claim 1, wherein the diameter of each tube in the compression section is between 1mm and 5mm larger than the drive element diameter.

25. Apparatus as claimed in claim 1, wherein the compression section has means to allow variation in the length of each tube.

26. Apparatus as claimed in claim 25, wherein variation in the length of the compression section is provided by interchangeability of compression section elements.

27. Apparatus as claimed in claim 1, including a cutter at the end of the compression section for cutting into sections food leaving the compression section.

28. Apparatus as claimed in claim 1, including a compression plate for applying pressure to food within the feed section such that the food is urged towards the drive element for onward movement into the compression section.

29. A food product producing apparatus as claimed in claim 1, in combination with a food manufacturing apparatus comprising ingredient silos, a mixing apparatus, a conveying means for transferring ingredients from the silos to the mixing apparatus, a binding material container, a means for conveying binding material to the mixing apparatus, a delivery apparatus for delivering mixed ingredients and the binding material from the mixing apparatus to the food product producing apparatus, an oven and a conveyor for conveying food from the compression section through the oven.

30. Apparatus as claimed in claim 1, wherein the parallel rotating helixes have a longitudinal axis extending through the helixes, the means being adapted to rotate about the longitudinal axis.

31. A fragile puffed, crisped or flaked cereal based food product producing apparatus, the apparatus comprising a feed section and a compression section, the feed section comprising a plurality of channels into which fragile puffed, crisped or flaked cereal is supplied and corresponding drive elements in the channels for moving the food along the channels, the compression section lying adjacent the feed section such that food is moved by the drive elements from the channels into the compression section, the compression section comprising tubes of selected cross-section and length, whereby in use food is moved along the channels and into the compression section by the drive elements, subjected to compression in the compression section and then leaves the compression section at the end thereof remote from the feed section; and the feed section further comprising a plurality of parallel rotating helixes located over the drive elements and at all times in operation spaced away from the drive elements for regulating the supply of food to the channels without compacting the food, wherein the plurality of parallel rotating helixes are adjacent and substantially touch each other during use.

* * * * *